Figure 1:
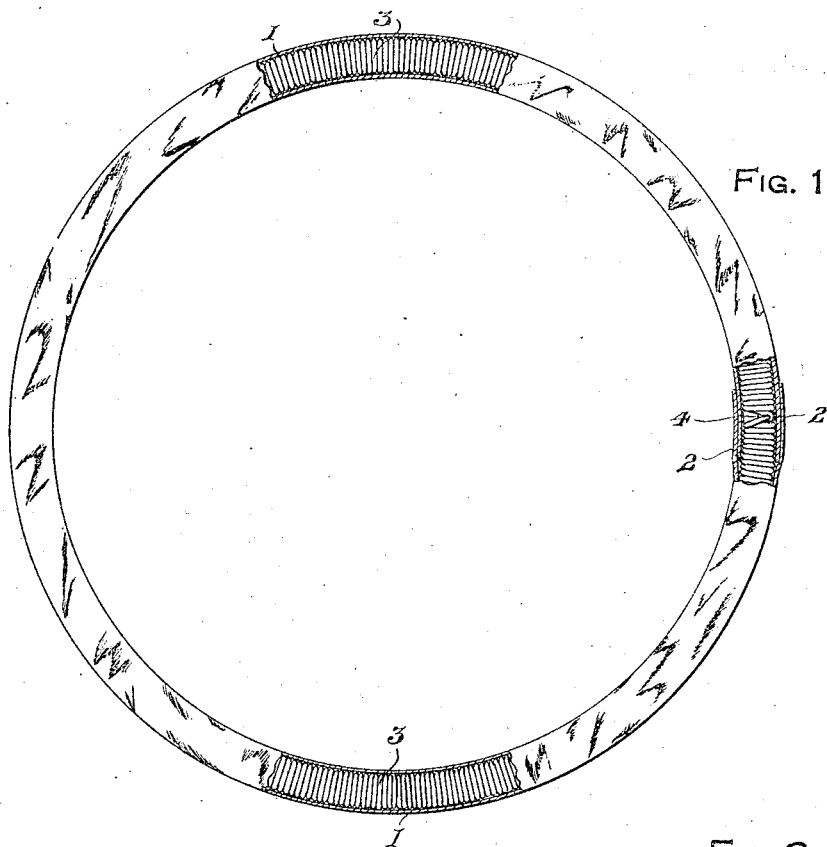

May 13, 1924.

W. J. SZCZEPANIAK

INNER TUBE FOR TIRES

Filed June 22, 1922

1,494,198

Inventor
W. J. Szczepaniak

By J. K. Bryant
Attorney

Patented May 13, 1924.

1,494,198

UNITED STATES PATENT OFFICE.

WALTER J. SZCZEPANIAK, OF MARCHE, ARKANSAS.

INNER TUBE FOR TIRES.

Application filed June 22, 1922. Serial No. 570,129.

*To all whom it may concern:*

Be it known that I, WALTER J. SZCZEPANIAK, a citizen of the United States of America, residing at Marche, in the county of Pulaski and State of Arkansas, have invented certain new and useful Improvements in Inner Tubes for Tires, of which the following is a specification.

This invention relates to certain new and useful improvements in inner tubes for tires and has particular reference to the provision of a coil spring enclosed by the inner tube that is confined within a shoe that operates in the absence of air under pressure.

The primary object of the invention resides in the provision of an inner tube for a pneumatic tire shoe wherein a tube formed of flexible material, such as rubber or fabric is bent into circular formation with the ends telescoped within each other and having a coil spring disposed therein with the convolutions thereof in abutting relation, one form of the invention providing a smooth exterior surface for the tube, while another form thereof embodies the idea of roughening or corrugating the exterior surface to prevent creeping movement thereof relative to the tire casing or shoe.

With the above general objects in view and others that will appear as the nature of the invention is better understood, the same consists in the novel construction, combination and arrangement of parts hereinafter more fully described, illustrated in the accompanying drawings, and pointed out in the appended claim.

Figure 2:
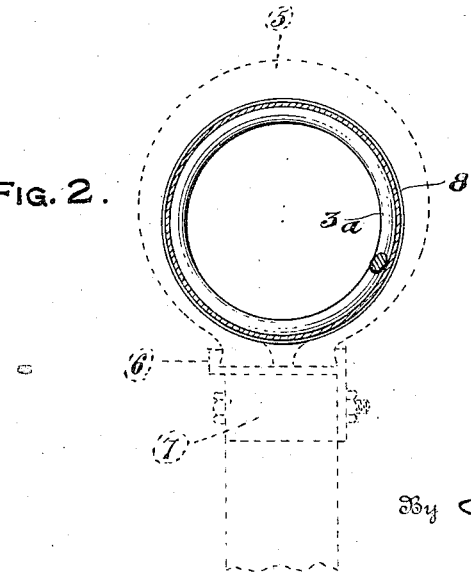
Figure 3:
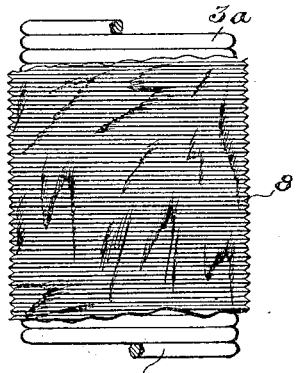

In the drawings forming a part of this application and in which like designating characters refer to corresponding parts throughout the several views:

Fig. 1 is a side elevational view, partly in section of a tire tube constructed in accordance with the present invention, showing the overlapping or telescoping ends of the tube and the coil spring confined therein, Fig. 2 is a cross sectional view of the tube illustrated in connection with a pneumatic tire shoe and wheel rim that are shown by dotted lines, Fig. 3 is a fragmentary detail view of a modified form of tube showing a roughened or corrugated outer surface.

Referring more in detail to the accompanying drawings, there is illustrated an inner tube for tire casings or shoes designated by the reference numeral 1, the same being formed of flexible material such as rubber or fabric, the tube being bent into circular formation with the ends thereof overlapped to form a telescopic joint as indicated at 2.

To sustain the circular formation of the tube 1 when the same is placed in a tire casing or shoe, the casing 1 encloses a coil spring 3 having the convolutions thereof juxtaposed as illustrated in Fig. 1, with the adjacent ends of the spring connected together as at 4, said connection maintaining the tube 1 in the circular formation illustrated with the ends of the tube in overlapped relation.

The tube is illustrated as enclosed within a tire casing or shoe 5, shown in Fig. 2, the shoe 5 being supported upon the rim 6 carried by the wheel felloe 7. The tube 1 operates in the absence of compressed air, the metallic coil spring 3 sustaining the tube in substantially circular formation and supporting the weight placed upon the vehicle wheel.

In the form of the invention shown in Fig. 3, the coil spring $3^a$ is enclosed by a flexible tube of rubber or fabric that has the outer face thereof provided with transverse circular corrugations 8 each consisting of outwardly converging side walls which terminate in a sharp edge for frictionally engaging the inner face of the tire casing or shoe 5 to prevent circumferential creeping of the tube within the shoe.

While the forms of the invention herein shown and described are what are believed to be the preferred embodiments thereof, it is nevertheless to be understood that various forms, modifications and arrangements of the parts may be made without departing from the spirit and scope of the invention as claimed.

What is claimed is:—

In a structure of the type described, a tire casing, an inner tube formation including a non-inflatable tube structure formed of flexible material bent into circular formation with the ends thereof overlapped to form a telescopic joint, and a coil spring enclosed by and forming a support for said tube to maintain the latter in circular formation, the convolutions of the spring being in abutting relation throughout the entire length of the spring with the adjacent ends thereof connected together within the telescopic joint of the tube, the said tube having its external surface roughened for preventing circumferential creeping of the tube within the casing, said roughened surface consisting of transverse circular corrugations each consisting of outwardly converging side walls which terminate in a sharp edge.

In testimony whereof I affix my signature.

WALTER J. SZCZEPANIAK.